US008825722B2

(12) United States Patent  (10) Patent No.: US 8,825,722 B2
Clay et al.  (45) Date of Patent: Sep. 2, 2014

(54) CALCULATION OF PROPERTIES OF OBJECTS/SHAPES ACROSS VERSIONS OF APPLICATIONS

(75) Inventors: Daniel Clay, Newcastle, WA (US);
Michael Woolf, Seattle, WA (US);
Matthew Dorbin, Seattle, WA (US);
Stephanie Lorraine Horn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 13/350,118

(22) Filed: Jan. 13, 2012

(65) Prior Publication Data

US 2013/0185339 A1  Jul. 18, 2013

(51) Int. Cl.
G06F 12/00 (2006.01)
G06F 7/00 (2006.01)

(52) U.S. Cl.
USPC ............ 707/821; 707/696; 707/795; 707/801

(58) Field of Classification Search
CPC ....... G06F 11/368; G06F 3/0484; G06F 8/24; G06F 8/71; G06F 9/4435
USPC ......................................................... 707/821
See application file for complete search history.

(56) References Cited

U.S. PATENT DOCUMENTS

| 753,943 | A | * | 3/1904 | Clarke ........................... 229/68.1 |
| 5,655,121 | A | | 8/1997 | Delagi et al. |
| 5,890,176 | A | | 3/1999 | Kish et al. |
| 6,016,492 | A | * | 1/2000 | Saxton et al. ........................... 1/1 |
| 6,457,013 | B1 | * | 9/2002 | Saxton et al. .................. 707/795 |
| 6,704,432 | B2 | * | 3/2004 | Eversole et al. ............... 382/100 |
| 6,868,425 | B1 | * | 3/2005 | Bergstraesser et al. ............... 1/1 |
| 6,915,301 | B2 | * | 7/2005 | Hirsch ........................... 717/100 |
| 7,257,772 | B1 | | 8/2007 | Jones et al. |
| 7,451,435 | B2 | | 11/2008 | Hunt et al. |
| 7,593,943 | B2 | * | 9/2009 | Clarke et al. ........................... 1/1 |
| 7,738,690 | B2 | * | 6/2010 | Liu et al. ........................ 382/135 |
| 7,941,659 | B2 | * | 5/2011 | Lam .................... 713/2 |
| 2002/0059293 | A1 | * | 5/2002 | Hirsch ...................... 707/103 R |
| 2002/0123992 | A1 | * | 9/2002 | Goldick ............................ 707/4 |
| 2003/0076978 | A1 | * | 4/2003 | Eversole et al. .............. 382/100 |

(Continued)

OTHER PUBLICATIONS

"The StarOffice™ 6.0 Suite," New Features Guide, author not available, obtained online Jul. 27, 2011 at http://download.oracle.com/docs/cd/E19064-01/so6/816-5405/816-5405.pdf, Jul. 2002, 34 pages.

"Collaborating With Previous Versions," author not available, obtained online Jul. 27, 2011 at http://technet.microsoft.com/en-us/library/cc179174%28office.12%29.aspx, 4 pages.

(Continued)

*Primary Examiner* — Binh V Ho
(74) *Attorney, Agent, or Firm* — Steve Crocker; Jim Ross; Micky Minhas

(57) ABSTRACT

Systems and methods are disclosed in which a self-describing file is generated and utilized to provide applications with the ability to properly preserve unknown file content. A self-describing file may contain, or be associated with, an extension section that provides information that an application can use to properly calculate unknown file content. The extension section may include functions of formulas that the application can use to calculate values for data that the application would not otherwise support. This allows for the content of the self-describing file to be modified by an application that does not support all of the capabilities of the file while maintaining the integrity of the file and user experience when the file is subsequently accessed by a full featured application.

21 Claims, 8 Drawing Sheets

(56) References Cited

U.S. PATENT DOCUMENTS

| | | | |
|---|---|---|---|
| 2005/0132356 A1* | 6/2005 | Cross et al. | 717/174 |
| 2006/0123412 A1* | 6/2006 | Hunt et al. | 717/174 |
| 2006/0161516 A1* | 7/2006 | Clarke et al. | 707/2 |
| 2007/0061716 A1 | 3/2007 | Kato | |
| 2008/0069427 A1* | 3/2008 | Liu et al. | 382/137 |
| 2009/0086259 A1 | 4/2009 | Bailey et al. | |
| 2009/0178026 A1* | 7/2009 | Mital et al. | 717/120 |
| 2010/0088587 A1 | 4/2010 | Ding et al. | |

OTHER PUBLICATIONS

"Considerations That Apply When You Store Visio Drawings That Are Saved as Web Pages in Windows SharePoint Services," author not available, obtained online Jul. 27, 2011 at http://support.microsoft.com/kb/825369, 2 pages.

PCT International Search Report and Written Opinion in International Application PCT/US2013/020914, mailed Apr. 23, 2013, 8 pgs.

* cited by examiner

Mobile Computing Device

CALCULATION OF PROPERTIES OF OBJECTS/SHAPES ACROSS VERSIONS OF APPLICATIONS

BACKGROUND

Different applications may be capable of operating upon files with the same or similar file types. However, the different applications may provide different file content and/or support different operations upon files. Oftentimes, it is desirable to maintain compatibility of a file created by a first version of an application with different versions of the application or different applications entirely. Doing so allows users of different applications to share, manipulate, and/or otherwise access a file created by the first version application even though the file may have been created using a version of the application that provides additional content, capabilities or features nor present in other versions or other applications. When this occurs, a less featured version of the application may be able to access and manipulate the file with respect to the capabilities and content it supports while ignoring the capabilities and content it does not, thereby providing the user of the less featured application with the ability to use and/or modify the application file. However, if the less featured application modifies the application file, it may not correctly preserve the portions of the file content unknown to the lesser featured application due to the limitation of the lesser featured application. It is with respect to this general environment that embodiments of the present disclosure have been contemplated.

Although specific problems have been addressed in this Background, this disclosure is not intended in any way to be limited to solving those specific problems.

SUMMARY

Embodiments of the present disclosure relate to maintaining properties stored in a file that may be shared by different versions of an application. A self-describing file may be used to provide an application with the information that may be used to correctly calculate or otherwise maintain file data, even if portions of the file data are not supported by a version of the application that manipulates the self-describing file. In embodiments, the self-describing file may contain an extension section, or may otherwise store or be associated with metadata, that describes the proper calculation of data that a version of an application may not support, thereby allowing the version of the application to properly preserve unknown file content. As such, the self-describing file may be utilized by applications to properly preserve unknown file content. Further embodiments disclosed herein relate to systems and method for generating and maintaining a self-describing file.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
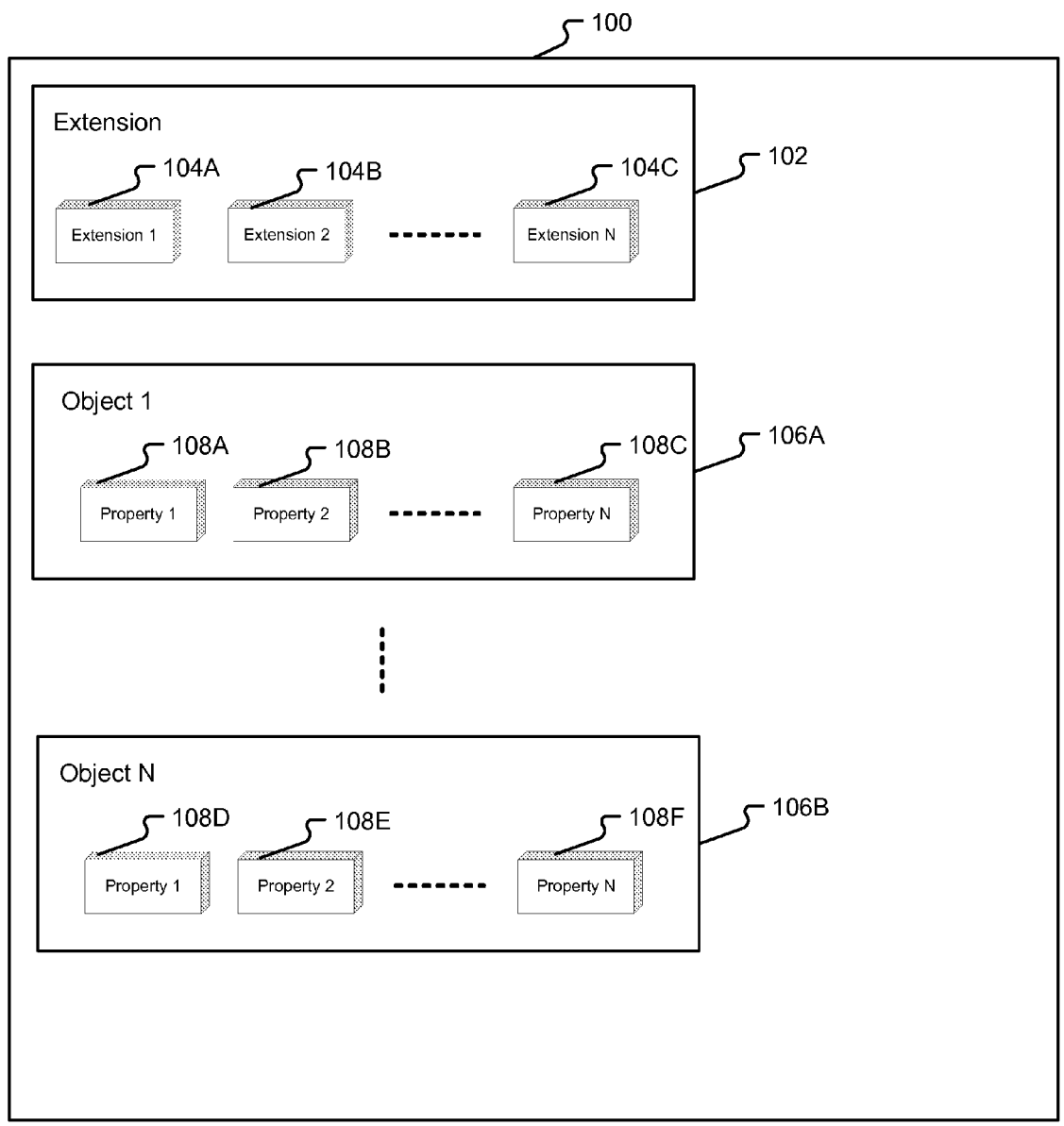
FIG. 1 illustrates an embodiment of a self-describing file 100 preserving unknown file contents.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure relate to maintaining properties stored in a file shared by different versions of an application. Software products are continually developed and released as new versions or different versions, each of which may provide different capabilities and/or content. Oftentimes, different applications may be capable of operating upon same file types. It is desirable to maintain compatibility of a file created by a first version of the application with different versions of the application or entirely different applications. Doing so provides users of different applications the ability share, manipulate, and/or otherwise access a file created by the first application even though the file may have been created using a version of the application that provides additional capabilities and/or content beyond the capabilities of other applications or other versions of the application. In such situations, a less featured version of the application may be able to access and manipulate the file, with respect to the capabilities and content the less featured application supports, while ignoring the capabilities and or content the less featured application does not support and/or provide. Thus a user of the less featured application has the ability to use and/or modify the application file crated by the first application. However, if the less featured application modifies the file created by the first application, the less featured application may not correctly preserve the portions of the file unknown to it due to the limitations of the less featured application.

In some circumstances, capabilities, content, and/or properties provided by a full featured (or newer version) of the application may be dependent upon content and/or properties of the application file that the less featured (or older version) application does not support. In such circumstances, a user of the less featured application may modify the property that the less featured application supports; however, because the less featured application does not support the additional capability, content, and/or properties it may not update the application file correctly with respect to the unsupported (or unknown) content.

For ease of discussion, embodiments and examples disclosed herein will be described with respect to a diagramming application, such as VISIO® provided by the Microsoft Corporation of Redmond, Wash. In a first embodiment, a full featured version of a diagramming application may provide properties for a shape such as color, shading, and transparency. The transparency property of the full featured application may be dependent upon the value of the shading property, so the first application calculates a value for the transparency property based upon the value of the shading property. The values for these properties may then be saved into an application file. The application file may then be opened by a second, less featured application. The less featured application may support the color and shading properties for shapes, but it may not support the transparency property or it may not treat the transparency property as dependent upon the shape. The second application may then modify the shading property of the shape and write the modification to the application file. However, because the second application does not recognize or support the dependency between the transparency property and the shading property, the second application may not properly update the transparency property in response to modifying the shading property. Because the transparency property was not correctly updated by the second application, when the first application subsequently accesses the application file, the first application may not be able to correctly display the transparency property of the shape. Although a diagramming application is used in the example, one of skill in the art will appreciate that the described problem is prevalent in other types of applications such as, but not limited to, word processing applications, spreadsheet applications, presentation applications, or any other type of versioned applications (or different applications) capable of sharing files. One of skill in the art will appreciate that the embodiments disclosed herein may be practiced with other diagramming applications or other types of applications.

Embodiments of the present disclosure provide an application with the ability to provide meaningful values for both native and extended objects, properties, relationships, formulas, and/or any other component of the self-describing file. In embodiments, a native object, property, relationship, formula, and/or component is a portion of a self-describing file that the application supports. As such, an application may be capable of properly handling and/or providing a value for a native component of the file. An extended object, property, relationship, formula, and/or component may be a portion of a self-describing file that an application may not support. As such, an application may not be capable of properly handling and/or providing a value for an extended portion of the file.

Embodiments of the present disclosure solve the exemplary problems by providing a self-describing file that may be shared between different versions of applications. In embodiments, the self-describing file may be used to provide an application with the information that may be used to correctly calculate (or otherwise maintain) file data even if portions of the file data are not supported by the application manipulating the self-describing file. The self-describing file may include information that allows an application to recalculate native and extended properties when modifying the self-describing file. Native properties may be values of the self-describing file that the application supports (e.g., objects, properties, formulas, etc. that are known to the application). Extended properties may be values of the self-describing file that the application does not support. In embodiments, the self-describing file may contain an extension section, or may otherwise store data that provides information related to the treatment of one or more sections of data in the self-describing file. In one embodiment, the information related to the treatment of the data may be provided in an extension section. The extension section may describe the proper calculation of data relied upon for file content, e.g., including file content that a version of an application may not support. The extension section thereby allows the less featured version of the application to properly preserve unknown file content.

In additional embodiments, a full featured version of an application is able to detect when another application has not properly calculated values of the file content. In such embodiments, the full featured version of the application may recalculate the miscalculated values and properly update the content of the file.

FIG. 1 is an embodiment of a self-describing file 100 for preserving unknown file contents for files that may be shared across different versions of an application. In embodiments, the self-describing file may contain one or more objects, such as Object 1 106A and Object N 106B. Although the self-describing file 100 illustrated in FIG. 1 contains two objects, the self-describing file 100 may contain any number of objects as illustrated by the ellipsis. In embodiments, the objects may relate to text, shapes, values, data structures, or any other type of data capable of being stored a file.

In embodiments, each object may have one or more properties associated with it, such as Property 1 108A, Property 2 108B, and Property 3 108C associated with Object 1 106A and Property 1 108D, Property 2 108E, and Property 3 108F associated with Object N 106B. Although Object 1 106A and Object N 106B are illustrated as having a three properties associated with each, one of skill in the art will appreciate that objects stored in the self-describing file 100 may have any number of properties associated with them or may not have any properties associated with them.

The objects and properties illustrated in FIG. 1 may differ depending on the application that the self-describing file 100 is employed with. For example, if the self-describing file 100 is associated with a diagramming application, the objects may relate to different shapes and the properties may relate to different characteristics of the shape (e.g., color, shading, transparency, size, outline, etc.) In another embodiment, if the self-describing file 100 is associated with a word processing application, the object may be related to a paragraph or text and the properties may be related to characteristics such as font face, font size, style, etc. In yet another embodiment, if the self-describing file 100 is associated with a spreadsheet application an object may represent a table or cell and the properties may represent characteristics such as values, formulas, fonts, etc. In alternate embodiments, a property may be any type of data included in the application. While specific examples of object and application are described herein, one of skill in the art will appreciate that these examples do not limit the scope of the disclosure and the embodiments of the self-describing file 100 disclosed herein may be employed regardless of the application and/or application data the self-describing file 100 is associated with.

In embodiments, the self-describing file 100 may contain an extension section 102. The extension section 102 contains information that describes the different types of data stored in the file. In embodiments, the extension section may contain information related to all of the data in the file or to a subset of data in the file. The extension section may describe a type of object, a property of an object, a value, or any other type of data stored in the self-describing file. For example, the extension section 102 may contain information describing object 106A, any of the properties 108A-108C, or any other type of data. The extension section 102 of the self-describing file 100 contains information that allows an application to correctly preserve content stored in the self-describing file 100 that is unknown to the application accessing the file. As such, the extension section 102 provides applications with information that may be used to update and or maintain data in the self-describing file 100 even if the application does not natively support the capability or property that the data is related to. In embodiments, the extension section may contain XML, binary, HTML, source code, or information in any other form that an application and/or processor executing the application is capable of interpreting.

Although illustrated as part of the self-describing file 100 in FIG. 1, in alternate embodiments the extension section 102 may exist external to the self-describing file 100. For example, the extension section 102 may be a separate file that is reference by the self-describing file 100. In other embodiments, the extension section may be stored separately from the self-describing file 100 but may be otherwise accessible to the application accessing the self-describing file 100 such as in a directory which the application has access to or on a network accessible by the application, such as, but not limited to, the Internet.

In embodiments, the extension section 102 may contain one or more extensions elements, such as Extension 1 104A, Extension 2 104B, and Extension N 104C. Although the embodiment illustrated in FIG. 1 provides three extension elements, one of skill in the art will appreciate that the extension section 102 may contain any number of extensions. In embodiments, the extensions are used to define objects, properties, or other types of data stored in the self-describing file 100 which may otherwise be unknown to or not natively supported by an application accessing the self-describing file 100. For example, the extensions may define a property that the application may not support. In other embodiments, the extensions may define a relationship between properties that the application may support, but may not be aware of the relationship between the properties. For example, referring again to an exemplary diagramming application, a first diagramming application may calculate the transparency property of a shape based upon the shading property of the shape. A second application may not natively support such a calculation and/or relationship. However, an extension provided in the extension section 102 of the self-describing file 100 may define the calculation and/or relationship, thereby providing the second application with the information that may be used to calculate the transparency property to produce a meaningful value. As such, in embodiments, the extension elements of the extension section 102 provide information, such as, but not limited to, formulas or functions that an application may use to properly calculate values for both natively supported and extend features. In doing so, the extension section may thus provide the application with the ability to preserve unknown (e.g., not natively supported) file contents.

In embodiments, the extension element may be an XML element stored in the extension section 102 of the self-describing file 100. In such embodiments, the extension element may be a top-level element that identifies information (e.g., formulas, functions, additional objects, additional properties, etc.) that may be used by applications accessing the self-describing file 100 to preserve the content of the self-describing file 100. In such embodiments, the extension element may contain one or more child elements that are used to provide descriptive information for one or more portions of the file content.

In one embodiment, the extension element may contain one or more child elements that identifies a type of section, object, or other type of data stored in the self-describing file 100. For example, an object element may be a child of the extension element that defines a section of the self-describing file or a type of object stored in the self-describing file 100. The object element may contain attributes that identify the type of object as well as the type of information that the object stores. In embodiments, the object element may be an XML element. An application may use information from the object element to identify an object stored in the file content.

An example of an object element may be a SectionDef element. In an embodiment where the self-describing file 100 is utilized with a diagramming application, the SectionDef element may identify the following types of objects and/or data: a character or set of characters, a paragraph, a scratch, a connection, a field, a control, a geometry, an action, a layer, a user, a property, a hyperlink, a reviewer, an annotation, an action tag, tabs, etc. Although specific examples are provided, one of skill in the art will appreciate that the SectionDef element is but one type of child element that identifies a specific object or data portion of the self-describing file 100. Table 1 provides an example embodiment of attributes that a SectionDef element may support.

TABLE 1

Example Embodiment of a SectionDef Element

| Attribute | Description |
|---|---|
| N | The name of the section. |
| T | The type of rows that will appear in this section. |
| S | A style inheritance path to follow. Possible values may be "Line," "Fill," "Text," etc. |

In further embodiments, the extension element may also contain one or more child elements that define a property that is stored in the self-describing file 100. In embodiments, a property element may contain information that an application may use to properly calculate a value for a certain property stored in the self-describing file 100.

An example of a property element may be a CellDef element. In an embodiment where the self-describing file 100 is utilized with a diagramming application, the CellDef element may define the type of value for a property. Table 2 provides an example embodiment of attributes that a CellDef element may support.

TABLE 2

Example Embodiment of a CellDef Element

| Attribute | Description |
|---|---|
| N | The name of the CellDef element. |
| T | The cell type. Possible values of T are:<br>1. BYTE: 1 byte unsigned byte<br>2. CHAR: 1 byte signed byte<br>3. BOOL: 1 byte Boolean<br>4. PCTU100_5: 1 byte unsigned percent, 0.00 to 100.0, rounded to half-percent, stored 0-255<br>5. WORD: 2 byte unsigned short<br>6. SHORT: 2 byte signed short |

TABLE 2-continued

Example Embodiment of a CellDef Element

| Attribute | Description |
|---|---|
| | 7. DWORD: 4 byte unsigned long |
| | 8. LONG: 4 byte signed long |
| | 9. FLOAT: 4 byte float |
| | 10. DOUBLE: 8 byte double |
| | 11. PERCENT: 8 byte percent, 100% = 1.0 |
| | 12. GUID: 16 byte GUID |
| | 13. MULTIDIM: 10 byte multi-dimensional UNUM |
| | 14. TWIPS: 2 byte signed 1/20ths of a point |
| | 15. CAL: 1 byte, MSO Calendar enumeration |
| | 16. ANY: 9 byte any allowed result |
| | 17. UNUM: double with units; |
| F | The cell default formula if no formula or value is written. |
| IX | The position of the column within a row. |

In embodiments, a property element may also define a formula or function that may be used to calculate the value of the property represented by the element. An application that does not support the property represented by the element may nonetheless use the formula or function provided as an attribute of the property element to calculate a value for the property. By doing so, the self-describing file 100 provides the application with the ability to preserve the value of the property that the application may not support, thereby preserving content, or aspects of the content, that may be unknown to the application. In other embodiments, the property element may define an object, property, or other component of the file. The definition may include data that a less featured application (e.g., an application that does not natively support the object, property, etc.) can utilized to calculate values for the non-supported object, property, etc.

In further embodiments, the extension element may contain one or more child elements that define, objects, properties, functions, and/or formulas that may be used to calculate values for properties, objects, or other components stored in the self-describing file 100. A function element may be associated with a property, an object, or any other type of data stored in the self-describing file 100. In such embodiments, the function element may be used, similar to the function attribute of the property element, to provide functions and/or formulas that an application may not natively support. By doing so, the function element provides for the preservation of values present in the self-describing file 100 that may be unknown to an application access the self-describing file. In embodiments, the function child provides an application with the ability to preserve unknown file contents, even if the application does not otherwise support or handle the file contents.

In embodiments, in order to preserve unknown file contents, an application accessing (e.g., opening) the self-describing file 100 may parse and load any information provided by one or more function elements stored in the extension section that is part of or associated with the self-describing file 100. In such embodiments, an application may use the data form the extension section to calculate and store a value for an object or property, even if that version of the application does not otherwise natively support the object or property. The calculated value may be stored in the self-describing file, thereby allowing the application to preserve unknown file content. In embodiments, the calculated value may differ from a value calculated by a full featured application; however, the information provided in the extension section may allow the less featured application to provide a value that is compliant with an expected value (e.g., a value calculated by a full featured application). As such, the information allows the less featured application to, at the very least, provide a meaningful value where without the information the less featured application may have returned an error or provided meaningless information.

As described herein, a self-describing file 100 may be used to prevent issues where object and/or property data not natively supported by an application is improperly maintained when the application modifies the content of the self-describing file 100. Returning to the transparency example in which the value of a transparency property is dependent upon the value of a shading property, an application that modifies the shading property of an object may nevertheless calculate a value for the transparency property using the functions, object, properties and/or other information described by the extension element and/or its child elements provided in the extension section 102 of the self-describing file 100, even if the application does not natively support calculation of the transparency property. Moreover, native objects and properties that have values dependent on an extended object, property, relationship, etc. (e.g., the transparency property from the examples provided) may also be calculated by the less featured application even though the extended property, object, relationship etc. may not be known to the lesser featured application.

Figure 2:
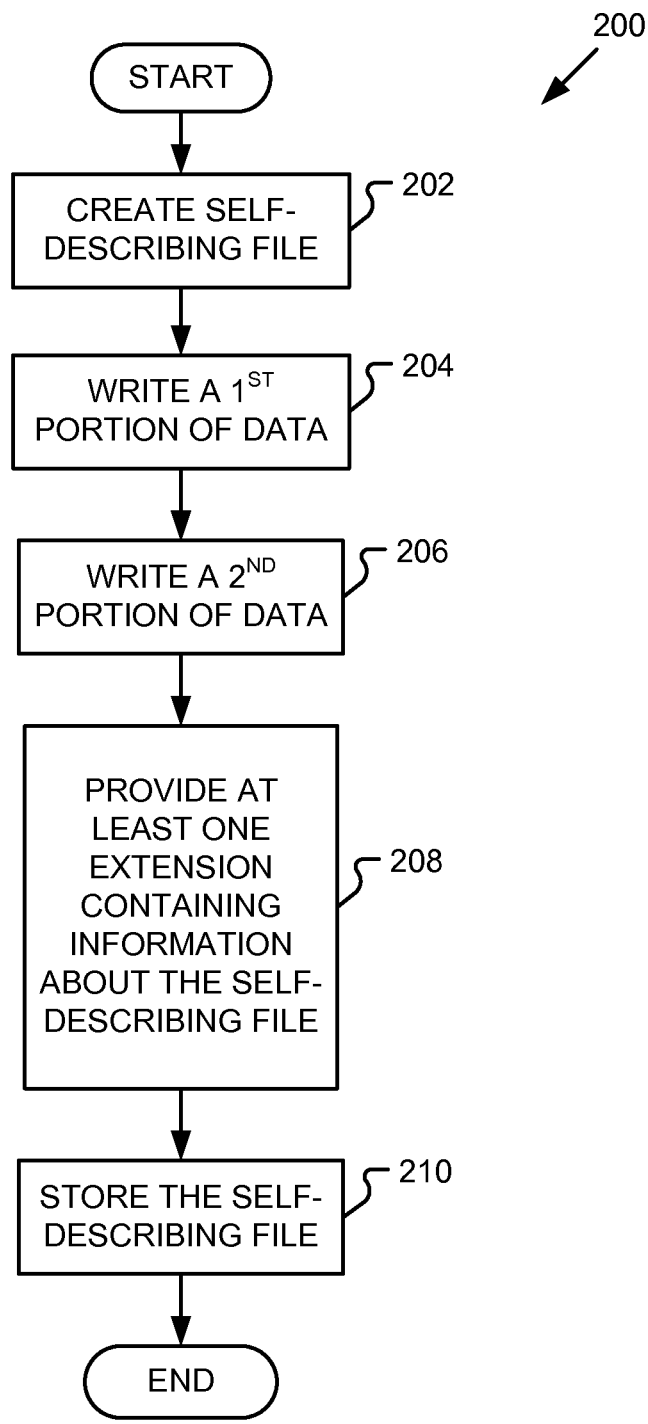
FIG. 2 is an illustration of a flow chart representing an embodiment of a method 200 for creating a self-describing file.

FIG. 2 is an illustration of a flow chart representing an embodiment of a method 200 for creating a self-describing file. Flow begins at operation 202 where an application creates a self-describing file, such as the self-describing file 100 from FIG. 1. In embodiments, an application may create the self-describing file in response to a command issued by a user or by another application. In embodiments, the self-describing file may be a diagram file created by a diagramming application, a document file created by a word processing application, a spreadsheet file created by a spreadsheet application, or any other type of file. In further embodiments, information provided by an extension element may also be used in conjunction with a data stream. As such, a less featured application may use self-describing information (provided in an extension element or otherwise) to properly manipulate data in a data stream.

During the creation operation 202, objects, properties, and/or components may be included in the self-describing file. In embodiments, the objects, properties, and or components may be written to the self-describing file. At operation 204 a first portion of data is written to the self-describing file. In embodiments, the first portion of data may be a property representing a characteristic of an object. For example, if the self-describing file is created by a diagramming application, it may contain an object representing a shape. The first portion of data may be a characteristic of the shape, such as the shape's color, size, outlining, shading, etc. As another example, if the self-describing file is created by a word processing application, an object representing a string of text may be written to the self-describing file. In such an embodiment, the first portion of data may be a characteristic of the text such as font face, font size, color, indentation, etc. As such, in embodiments, a first portion of data may represent a characteristic of any object in the self-describing file, any component of the self-describing file (such as a section, a template, etc.) or a characteristic of the self-describing file itself. In further embodiments, the first portion of data may be an object, a property, a formula, a relationship, a component or any other type of data that may be written to the self-describing file.

Flow continues to operation 206 where at least a second portion of data is written to the self-describing file. Similar to the first portion of data, the second portion of data may represent an, object, a property, a characteristic of any object in the self-describing file, or any component of the self-describing file (such as a section, a template, etc.) or a characteristic of the self-describing file itself. In embodiments, the second portion of data may be related to the first portion of data. For example, the value of the second portion of data may depend upon the value of the first portion of data. Furthermore, the second portion of data may be natively supported by a first application that creates the self-describing file, but it may not be natively supported by other applications that may subsequently access the self-describing file. As such, a second application that later accesses and modifies the file, for example, by writing a new value for the first portion of data, may not correctly update the second portion. In such circumstances, when the application that created the file again accesses the file, it may encounter an error with respect to the second portion of data. Exemplary errors include errors with respect to displaying the second portion of data to the user, errors accessing the second portion of data, errors writing a value related to the second portion of data, errors in the value of the second portion of data, or any other type of error.

To prevent error situations, flow proceeds to operation 208 where the application provides at least one extension that provides information about the portions of the file that a less featured application may not natively support. For example, the one or more extension may define a relationship between the first portion of data and the second portion of data, may define the second portion of data, or may provide any other type of information regarding the file that a different version of an application (or different application altogether) may not natively support. In embodiments, defining a relationship may entail providing a formula to calculate the second portion of data based on the first, data defining the second portion of data (e.g., the structure of the data, information about the fields of the data, etc.), or any other information about the second portion of data that an application accessing the self-describing file may not natively understand and/or support. In embodiments, the at least one extension may be written to the extension section that may be part of or associated with the self-describing file, such as extension section 102 of FIG. 1. In alternate embodiments, the at least one extension may be provided in a separate file that is related to the self-describing file, as described with respect to FIG. 1. The at least one extension provided at operation 208 may be of the type of extension elements and/or the child described. One of skill in the art will appreciate that an extension may take any form so long as it describes a relationship, an object, a property, a formula, or any other component of a self-describing file in a manner such that a second application that subsequently accesses the self-describing file is capable of calculating a value for the relationship, an object, a property, a formula, or any other component even if the second application does not natively support such calculations.

In embodiments, the application that creates the self-describing file may generate the at least one extension that provides information about at least a portion of the content of the self-describing file. For example, the application may generate a function or formula that describes the relationship between the first portion of data and second portion of data. In embodiments, the application creating the self-describing file may also include information in the extension section related to properties, object, or other elements of the file that a less featured application may not natively support. Such information may be provided in the at least one extension. In an alternate embodiment, the application creating the self-describing file may receive information about the extension from another source. For example, the application creating the self-describing file may receive a formula or function describing the relationship from a user, from another application, or from a file stored locally or on a network. Regardless of whether the application generates the extension itself or receives the extension from another source, the extension may be included in the self-describing file at operation 208.

After providing the at least one extension at operation 208, flow continues to operation 210 where, in embodiments, the application creating the self-describing file writes any additional data (e.g., additional object, properties, extensions, etc.) to the file and saves the file. In embodiments, the file may be saved in computer storage media, such as the computer storage media described in FIG. 5. Storing the self-describing file allows the applications to access the self-describing file in the future.

Although the method 200 is described as providing two portions of data to the self-describing file, one of skill in the art will appreciate that any number of properties may be included in the self-describing file. Additionally, in embodiments, any number of extensions may be written to the self-describing file defining different types of relationships, properties, objects, etc. For example, a third property may be written to the self-describing file. The value of the third property may be dependent upon the value of the second property. In embodiments, an extension may be written to the self-describing file that defines the calculation used to derive a value for the third property based upon the second property. Furthermore, if the second property in the described embodiment is related to the first property, the third property is also related to the first property based upon the defined calculation. In such embodiments, the extensions defining the relationship (e.g., defined calculations) between the first and second properties and the second and third properties will capture such relationships between the properties. In embodiments, the relationships between an unsupported second property, defined in the one or more extensions, and a supported third property may be defined in the data associated with the third property. The definition of the second property in the extension section may allow the third property to recalculate and preserve values associated with the third property.

In further embodiments, complex relationships may be defined by one or more extensions. For example, a fourth property and a fifth property may be added to the self-describing file during the method 200. The value of the fifth property may be related to both the fourth and first properties. In embodiments, one or more extensions may be provided that capture the multiple dependency of the fifth property. One of skill in the art will appreciate that embodiments of self-describing file disclosed herein may be capable of capturing any type of relationship or dependency, regardless of the complexity, by including relationship information in the self-describing file (e.g., by including one or more extensions).

In another embodiment, rather than defining a relationship between two portions of data the extension may provide information about a single portion of data that a less featured application may not natively support. For example, the extension may contain information defining an object, property, or other component of the self-describing file that may not be natively supported by some versions of an application. In embodiments, the information defining the object, property, or other component of the self-describing file may provide the less featured application with enough detail to calculate a value for the unsupported portion of the file. As such, extension data may be used for providing information about portions of a file other than information related to relationships.

The self-describing file created and saved during the method 200 may be of any type. For example, the self-describing file may be a word processing file, a diagramming file, a spreadsheet file, an image file, or any other type of file that an application is capable of accessing and/or modifying. Furthermore, in embodiments, the self-describing file may be written in any number of formats without departing from the spirit of the embodiments disclosed herein. The self-describing file type may be written in an XML format, an HTML format, in a binary format, or any other type of format known to the art. While the method 200 describes a discrete number of steps occurring in a particular order, one of skill in the art will appreciate that the method 200 may be performed in a different order or may comprise fewer or additional steps.

Figure 3:
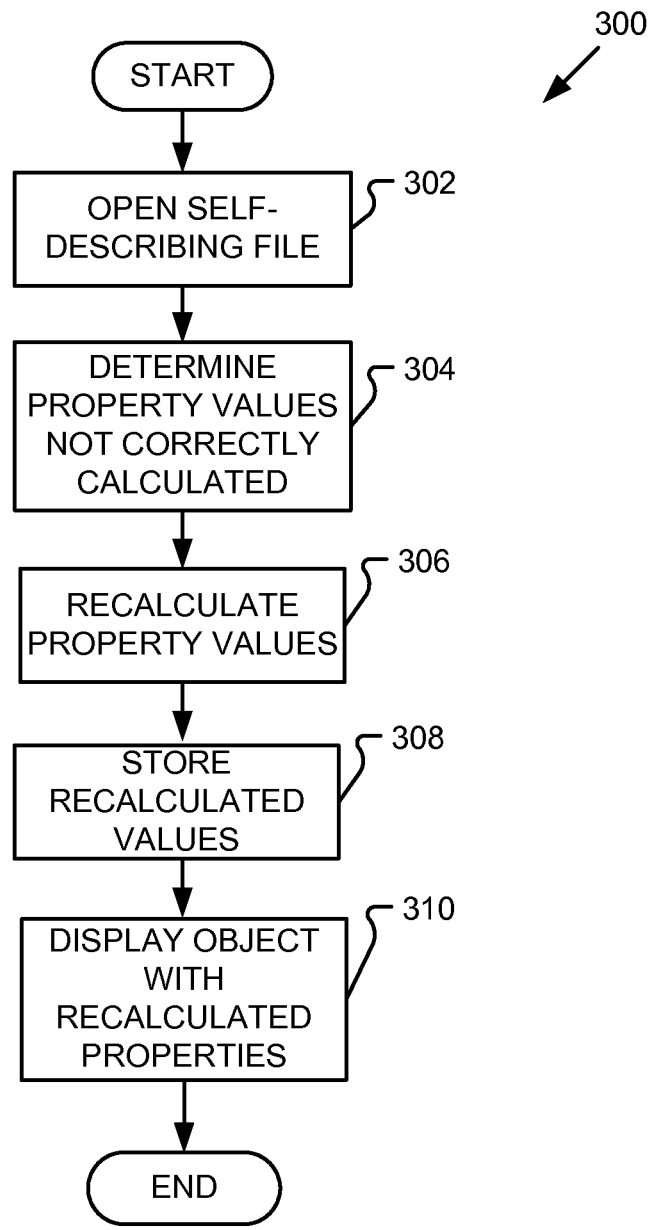
FIG. 3 is an illustration of a flowchart representing an embodiment of a method 300 performed by an application capable of properly recalculating properties values stored in a self-describing file.

FIG. 3 is an illustration of a flowchart representing an embodiment of a method 300 performed by an application capable of properly recalculating properties values stored in a self-describing file. For example, embodiments of the method 300 may be performed by a full featured application that is capable of supporting and/or understanding the objects, properties, and/or capabilities provided in the self-describing file. Flow begins at operation 302 where an application opens or otherwise accesses the self-describing file. In embodiments, the step of opening the self-describing file may occur after another application accessed and/or modified the self-describing file. However, the other application may not have correctly preserved the content of the file when modifying it. This may occur due to limitations in the other application's capabilities, the other application's inability to understand the content of the file, an error encountered by the other application when writing information to the self-describing file, or for any other reason.

Flow continues to operation 304 where the application determines that at least one portion of the content of the self-describing file has not been properly maintained. For example, a second property of an object that is dependent upon a first property may not have been correctly recalculated upon modification of the first property. In one embodiment, the application may make such a determination by parsing the file to check for missing and/or incorrect data. In another embodiment, the determination may be made by checking for an indicator within the file that the file contents have not been correctly updated. For example, the indicator may be a flag or an error message placed within or associated with the self-describing file. Although specific examples are provided as to the process and mechanisms used by the application to make the determination at operation 304, one of skill in the art will appreciate that any manner of determining that that at least a portion of the content of the self-describing file is incorrect may be employed at operation 304.

Flow continues to operation 306 where the application recalculates any of the file content that was improperly updated during a previous modification of the self-describing file. In one embodiment, the application may recalculate a value for a property, object, or other portion of the content based upon a relationship, function, or formula provided in an extension included in the extension section of the self-describing file. In another embodiment, the application performing operation 306 may be a full featured application that is capable of supporting all objects, properties, and/or capabilities of the self-describing file. As such, the full featured application may be capable of natively recalculating any errant data without reliance upon an extension element in the self-describing file. In such an embodiment, the recalculation of the file content at operation 306 may further include the addition of information (e.g., object, properties, formulas, and/or functions provided by the extension elements described with respect to FIG. 1) to the self-describing file. For example, the content of the self-describing file may not have been properly preserved by the last application due to the fact that an extension defining a relationship of the content was missing from the file. Upon recalculating the file content at operation 306, the full featured application may prevent future miscalculations by updating an extension section included in or associated with the self-describing file.

Flow continues to operation 308 where the application stores the recalculated file content (e.g., property values, objects, etc.) in the self-describing file. In embodiments, the recalculated values may be stored by writing the values to the self-describing files at operation 308. In further embodiments, operation 308 may also include writing or otherwise storing information related to a portion of a file (e.g., extension objects) to an extension section that is part of or associated with the self-describing file at operation 308.

In embodiments, flow continues to operation 310 where the application displays the file contents from the self-describing file to the user. For example, an object and its properties may be displayed to the user. Returning to the example involving the diagramming application, a shape may be displayed to the user in a manner such that its properties are correctly calculated and displayed. In embodiments, because the application recalculated and stored any improperly maintained file contents at operations 306 and 308, the file is correctly displayed to the user at operation 310. By doing so, the problems that occur when a less featured application modify a file shared between applications are avoided, thereby providing a user of a less featured application with an enhanced experience by providing a more complete calculation of data for the file.

While operation 310 is described as displaying the content of the self-describing file to the user, one of skill in the art will appreciate that the application may perform other functionality at operation 310 such as, but not limited to, playing a video, playing audio, or otherwise executing the self-describing file to perform a function or task. Additionally, while the method 300 describes a discrete number of steps occurring in a particular order, one of skill in the art will appreciate that the method 300 may be performed in a different order or with more or fewer steps.

Figure 4:
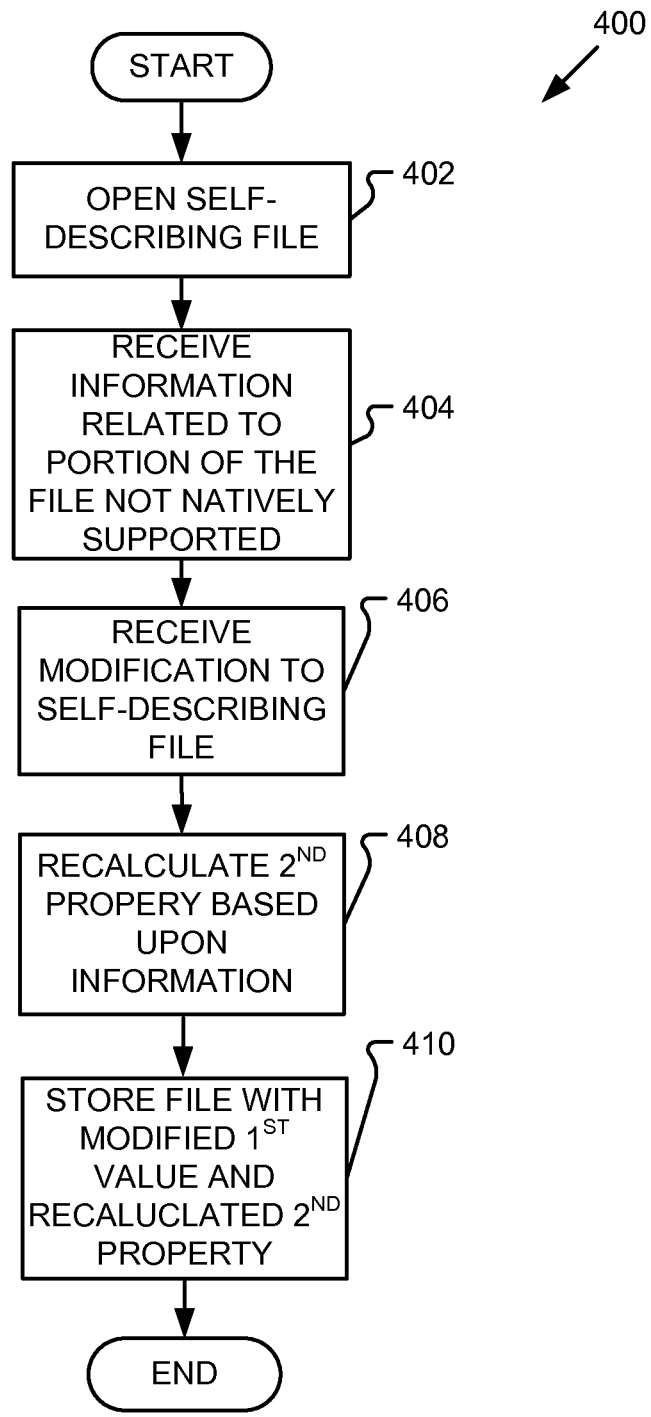
FIG. 4 is an illustration of flowchart representing an embodiment of a method 400 for preserving unknown file contents.

FIG. 4 is an illustration of flowchart representing an embodiment of a method 400 for preserving unknown file contents. In embodiments, an application performing the method 400 may be a less featured application that does not natively support or understand all of the capabilities or file contents (e.g., objects, properties, etc.) of the self-describing file. Flow begins at operation 402 where an application opens a self-describing file, such as the self-describing file 100 of FIG. 1. Upon opening the file, flow continues to operation 404 where the application receives information related to a portion of the self-describing file that the application may not natively support. For example, in one embodiment the application may receive information defining an object, property, characteristic, or other portion of the file that the application does not support. In another embodiment the application receives an indication that at least one portion of data in the file is dependent upon a first portion of the file. For example, a second property of an object may be dependent upon a first property of an object. In yet another embodiment, the application receives and indication that certain data is to be updated in the self-describing file upon performing an action.

In embodiments, the application receives an indication by processing an extension section that may be part of or associated with the self-describing file. In embodiments, the application may examine one or more extension elements (or one or more children of an extension element) in order to derive information to calculate values for extended portions of the file that the application does not natively support. An extended portion may be one or more objects, properties, formulas, or any other component or feature of the self-describing file that the application does not natively support. In embodiments, the one or more extension elements may provide information to the application performing the method 400 to properly preserve content of the self-describing file, even if the application does not support or understand the content. For example, the information received at operation 404 may contain a function or formula that the application may use to derive a value for a property, even if the application does not natively support the property.

Flow continues to operation 406 where the application modifies a portion of the self-describing file. For example, the application may modify the file content of a first property based upon user input, such as, for example, the user changing the shading value of a shape. In other embodiments, the application may perform the modification automatically or in response to an instruction received from another application.

In embodiments, the value of a second property may be dependent upon the value of a first property. However, a less featured application modifying the first property may not natively support the second property, may not natively understand the relationship between the first and second property, or may not natively know the formula or function used to recalculate the second value. However, because the application received information indicating the relationship between the properties at operation 404 (e.g., a formula used to calculate the second property), the application is capable of properly recalculating the second value if necessary.

Flow continues to operation 408 where the application recalculates the value of the second property based upon the modification to the first property. The application may use the information received at operation 404 to recalculate the value of the second property. For example, the information may include a formula for determining the value of the second property based upon the first value. At operation 408, the application may use the formula to recalculate a value for the second property. As such, the application performing the method 400 is capable of properly preserving file content, even if the file content is unknown or unsupported by the application, using the information received at operation 404. As such, the information in one or more extensions associated with the self-describing file provides an application with the ability to modify both native and extended portions of the file content, thereby providing application with the ability to support extended functionality in addition to the application's native functionality.

Upon recalculating the value, flow continues to operation 410 where the application writes the modified first property and the recalculated second property to the self-describing file. In embodiments, the application may store the modified self-describing file in computer storage media, such as the computer storage media described in FIG. 5 at operation 410.

While embodiments of the method 400 are described with respect to modifying a first property value and recalculating a property value, one of skill in the art will appreciate that the method may be extended to receive modifications and perform recalculations on more properties. Additionally, while the method 400 is described as receiving modifications to and recalculating the values of properties, the method may be employed to preserve any type of file content such as, but not limited to, objects, sections, templates, etc. Furthermore, while the method 300 describes a discrete number of steps occurring in a particular order, one of skill in the art will appreciate that the method 300 may be performed in a different order or with more or fewer steps.

Figure 5:
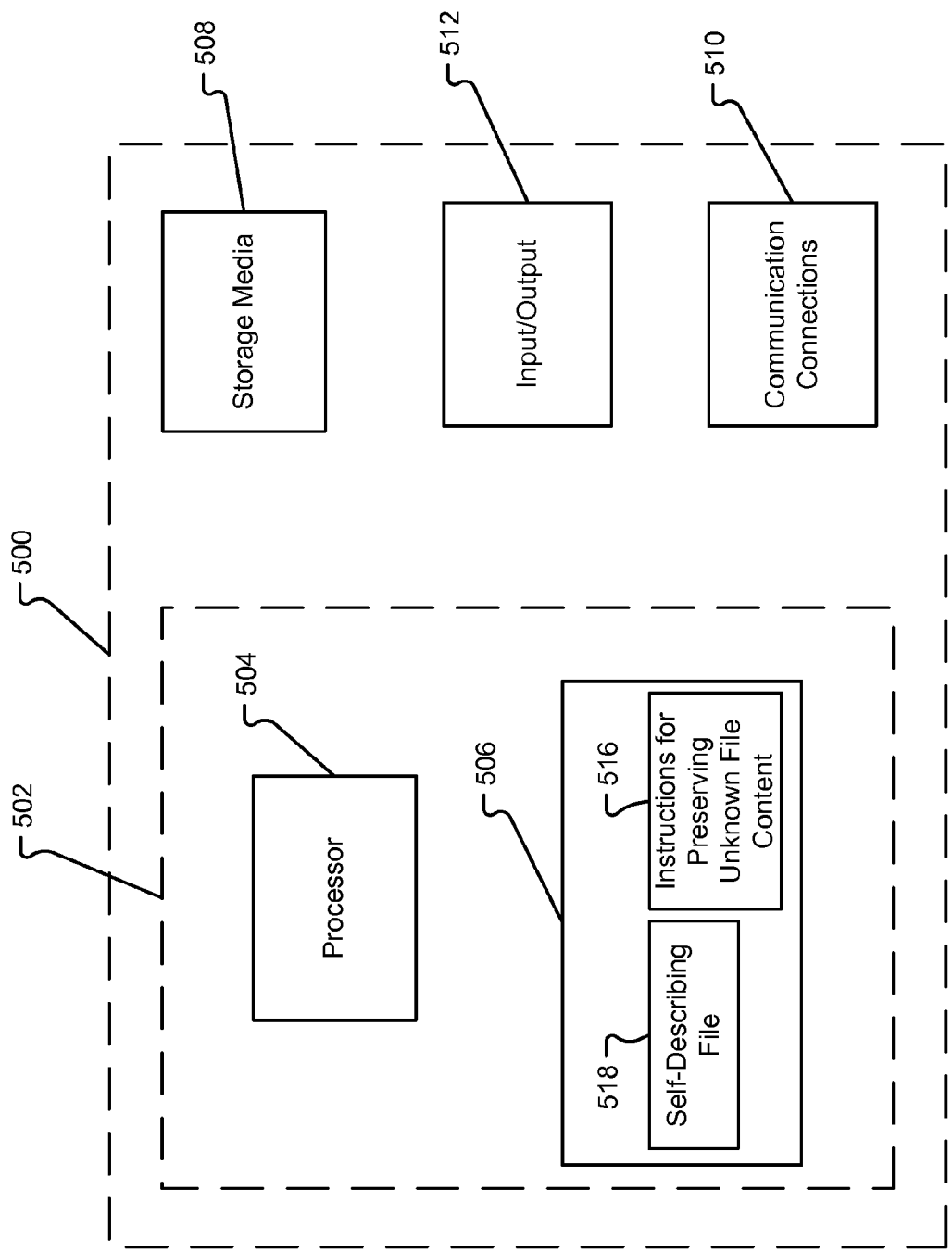
FIG. 5 illustrates an embodiment of a computer environment and computer system 500 for implementing the methods disclosed herein.

With reference to FIG. 5, an embodiment of a computing environment for implementing the various embodiments described herein includes a computer system, such as computer system 500. Any and all components of the described embodiments may execute as or on a client computer system, a server computer system, a combination of client and server computer systems, a handheld device, a tablet computing device, and other possible computing environments or systems described herein. As such, a basic computer system applicable to all these environments is described hereinafter.

In its most basic configuration, computer system 500 comprises at least one processing unit or processor 504 and system memory 505. The most basic configuration of the computer system 500 is illustrated in FIG. 5 by dashed line 502. In some embodiments, one or more components of the described system are loaded into system memory 505 and executed by the processing unit 504 from system memory 506. Depending on the exact configuration and type of computer system 500, system memory 506 may be volatile (such as RAM), non-volatile (such as ROM, flash memory, etc.), or some combination of the two.

Additionally, computer system 500 may also have additional features/functionality. For example, computer system 500 includes additional storage media 508, such as removable and/or non-removable storage, including, but not limited to, magnetic or optical disks or tape. In some embodiments, software or executable code and any data used for the described system is permanently stored in storage media 508. Storage media 508 includes volatile and non-volatile, removable and non-removable media implemented in any method or technology for storage of information such as computer readable instructions, data structures, program modules, or other data. In embodiments, the disclosed self-describing files and the instructions to perform the methods of generating self-describing files and preserver unknown content are stored in storage media 508.

System memory 506 and storage media 508 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 500 and processor 504. Any such computer storage media may be part of computer system 500. In embodiments, system memory 506 and/or storage media 508 stores data used to perform the methods and/or form the system(s) disclosed herein, such as, creating a self-describing file and preserving unknown file content. In embodiments, system memory 506 stores information such as a self-describing file 514 and instructions 516 for performing a method of preserving unknown file content as discussed with respect to FIGS. 1 and 4. Although not shown in FIG. 5, instructions to perform a method of generating a self-describing file and recalculating the values of contents in a self-describing file as discussed with respect to FIGS. 2 and 3 may also be stored in system memory 506.

Computer system 500 may also contain communications connection(s) 510 that allow the device to communicate with other devices. In embodiments, communications connection(s) 510 may be used to transmit and receive messages between sender devices, intermediary devices, and recipient devices. Communication connection(s) 510 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media.

In some embodiments, computer system 500 also includes input and output connections 512, and interfaces and peripheral devices, such as a graphical user interface. Input device(s) are also referred to as user interface selection devices and include, but are not limited to, a keyboard, a mouse, a pen, a voice input device, a touch input device, etc. Consistent with embodiments of the present disclosure, the input device may comprise any motion detection device capable of detecting the movement of a user. For example, the input device may comprise a KINECT® motion capture device, from Microsoft Corporation, comprising a plurality of cameras and a plurality of microphones. Other embodiments are possible. Output device(s) are also referred to as displays and include, but are not limited to, cathode ray tube displays, plasma screen displays, liquid crystal screen displays, speakers, printers, etc. These devices, either individually or in combination, connected to input and output connections 512 are used to display the information as described herein. All these devices are well known in the art and need not be discussed at length here.

In some embodiments, the component described herein comprise such modules or instructions executable by computer system 500 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 500 is part of a network that stores data in remote storage media for use by the computer system 500.

The example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device. Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the self-describing files may be operated via application-specific logic integrated with other components of the computing device 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Figure 6A:
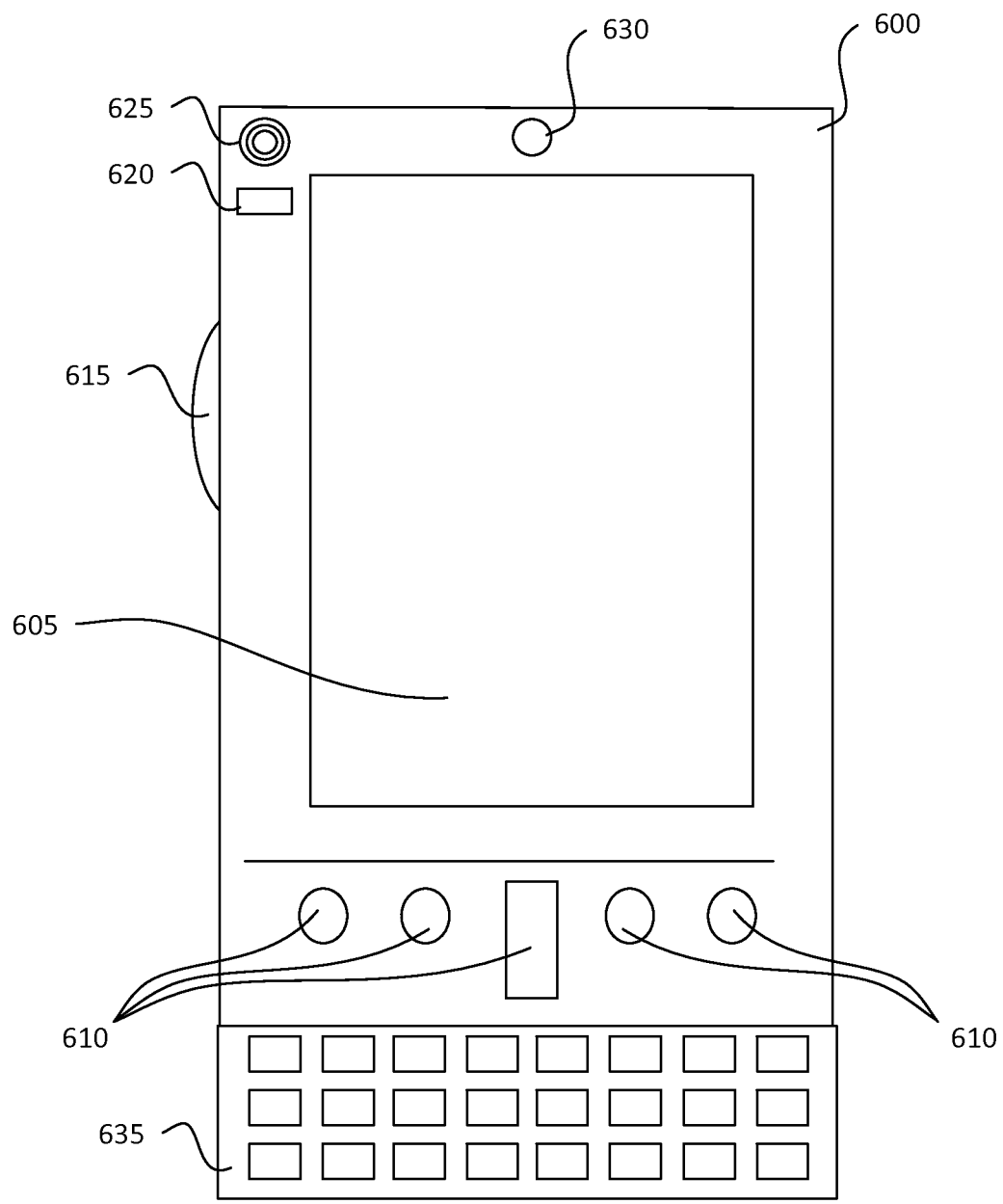
FIG. 6A illustrates one embodiment of a mobile computing device 600 for executing embodiments of creating and utilizing self-descriptive file formats described herein.
Figure 6B:
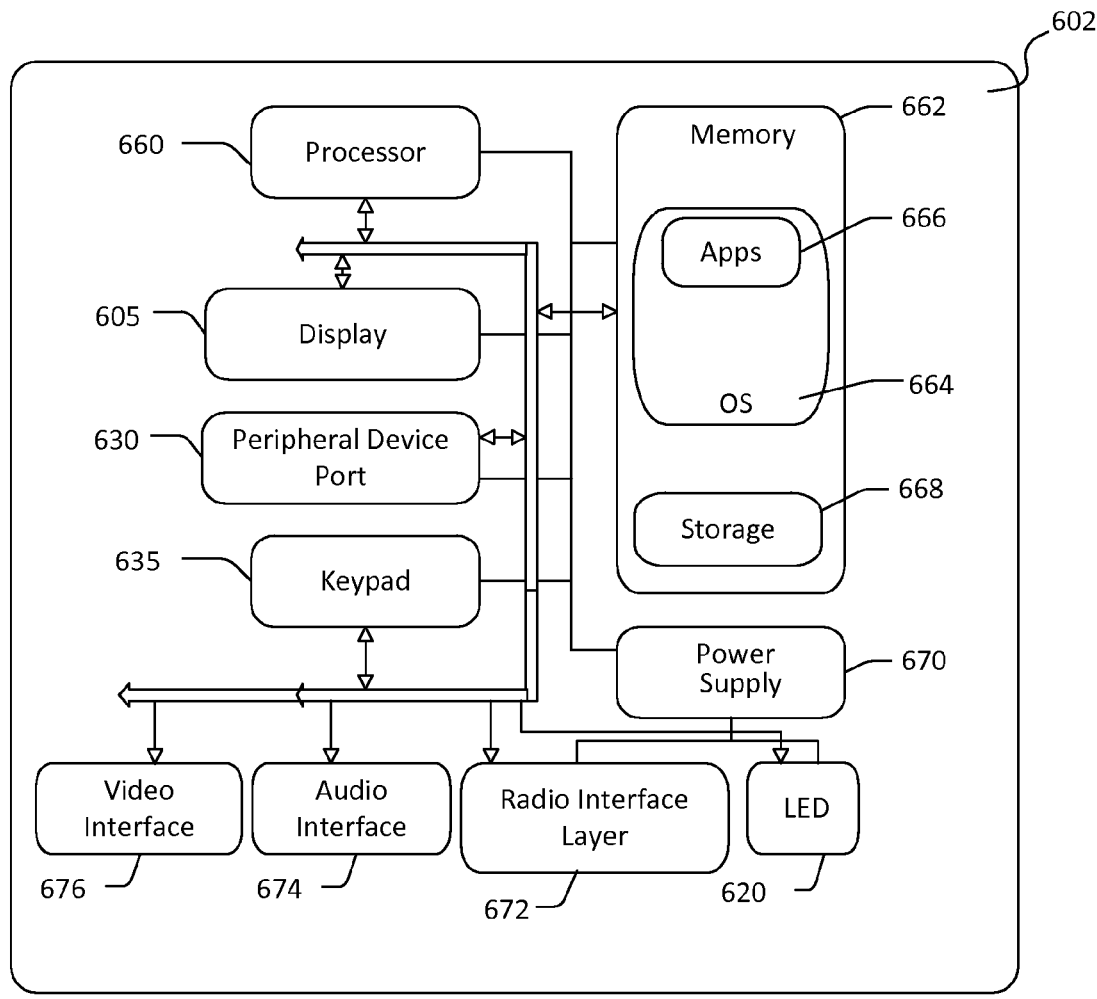
FIG. 6 is a simplified block diagram of an exemplary mobile computing device system 602 suitable for practicing embodiments of the self-describing file format disclosed herein.

FIGS. 6A and 6B illustrate a mobile computing device 600, for example, a mobile telephone, a smart phone, a tablet personal computer, a laptop computer, and the like, with which embodiments of the disclosure may be practiced. With reference to FIG. 6A, an exemplary mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In embodiments, the content of the self-describing file may be displayed on the display 605.

Although described herein in combination with the mobile computing device 600, in alternative embodiments of the disclosure may be used in combination with any number of computer systems, such as in desktop environments, laptop or notebook computer systems, multiprocessor systems, microprocessor based or programmable consumer electronics, network PCs, mini computers, main frame computers and the like. Embodiments of the disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, diagramming applications, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the self-describing file, the method of creating a self-describing file, and the method of preserving unknown file contents disclosed herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world", via a communications carrier or service provider. Transmissions to and from the radio 672 are conducted under control of the operating system 664. In other words, communications received by the radio 672 may be disseminated to the application programs 666 via the operating system 664, and vice versa. The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 602 provides notifications using the visual indicator 620 that can be used to provide visual notifications and/or an audio interface 674 producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
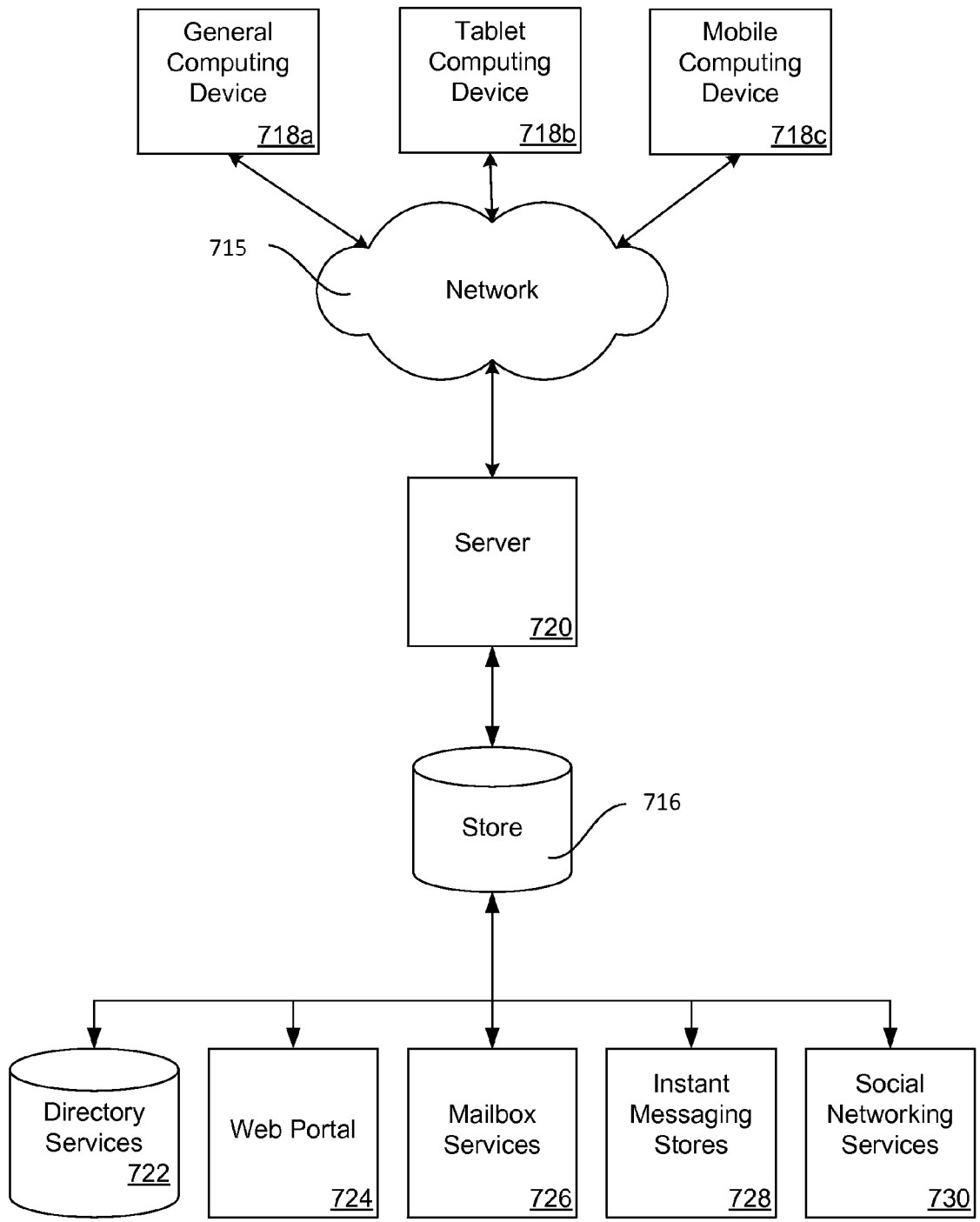
FIG. 7 illustrates an embodiment of a system for providing the embodiments disclosed herein to one or more client devices.

FIG. 7 illustrates one embodiment of the architecture of a system for providing the self-describing file 100 and the methods disclosed herein to one or more client devices, as described above. Content developed, interacted with or edited in association with the self-describing file 100 may be stored in different communication channels or other storage types. For example, various documents may be stored using a directory service 722, a web portal 724, a mailbox service 726, an instant messaging store 728, or a social networking site 730.

The self-describing file 100 may use any of these types of systems or the like for enabling data utilization, as described herein. A server 720 may provide the self-describing file 100 and/or methods for creating or modifying the self-describing file disclosed herein to clients. As one example, the server 720 may be a web server providing the self-describing file 100 and/or the methods for creating or modifying the self-describing file disclosed herein over the web. The server 720 may provide the self-describing file 100 and/or methods for creating or modifying the self-describing file disclosed herein over the web to clients through a network 715. By way of example, the client computing device 718 may be implemented as the computing device 500 and embodied in a personal computer 718a, a tablet computing device 718b and/or a mobile computing device 718c (e.g., a smart phone). Any of these embodiments of the client computing device 718 may obtain content from the store 716. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

This disclosure described some embodiments with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A method for calculating properties of an object defined by a first application, the method comprising:
    opening, by a second application, a self-describing file created by the first application, wherein the self-describing file comprises:
        a first property of the object; and
        a second property of the object, wherein the second application does not natively support the second property of the object;
    receiving an indication that the second property of the object is dependent on the first property of the object;
    receiving a modification to the first property of the object;
    recalculating a value of the second property of the object based upon the indication that the second property of the object is dependent on the first property of the object; and
    storing the file, wherein the stored file comprises the recalculated value for the second property of the object.

2. The method of claim 1, wherein the self-describing file further comprises a formula for calculating the value of the second property of the object.

3. The method of claim 2, wherein the formula defines a relationship between the first property and the second property.

4. The method of claim 2, wherein recalculating the value of the second property of the object based upon the indication that the second property of the object is dependent on the first property of the object comprises recalculating the value using the formula.

5. The method of claim 1, wherein the indication that the second property of the object is dependent on the first property of the object is defined by an extension element associated with the self-describing file.

6. The method of claim 1, further comprising:
    receiving an indication that a third property of the object is dependent on the second property of the object; and
    recalculating a value of the third property of the object based upon the indication that the third property of the object is dependent on the second property of the object.

7. The method of claim 1, further comprising displaying at least one native property of the object by the second application.

8. The method of claim 1, further comprising recalculating a native property value based upon a second property value of the object.

9. A computer storage memory device encoding computer-executable instructions that, when executed by at least one processor, perform a method for calculating properties of an object defined by a first application, the method comprising:
    opening, by a second application, a self-describing file created by the first application, wherein the self-describing file comprises:
        a first property of the object; and
        a second property of the object, wherein the second application does not natively support the second property of the object;
    receiving an indication that the second property of the object is dependent on the first property of the object;
    receiving a modification to the first property of the object;
    recalculating a value of the second property of the object based upon the indication that the second property of the object is dependent on the first property of the object; and
    storing the file, wherein the stored file comprises the recalculated value for the second property of the object.

10. The computer storage memory device of claim 9, wherein the self-describing file further comprises a formula for calculating the value of the second property of the object.

11. The computer storage memory device of claim 10, wherein the formula defines a relationship between the first property and the second property.

12. The computer storage of claim 10, wherein recalculating the value of the second property of the object based upon the indication that the second property of the object is dependent on the first property of the object comprises recalculating the value using the formula.

13. The computer storage memory device of claim 9, wherein the indication that the second property of the object is dependent on the first property of the object is defined by an extension element associated with the self-describing file.

14. The computer storage memory device of claim 9, further comprising:
   receiving an indication that a third property of the object is dependent on the second property of the object; and
   recalculating a value of the third property of the object based upon the indication that the third property of the object is dependent on the second property of the object.

15. The computer storage memory device of claim 9, further comprising displaying at least one native property of the object by the second application.

16. The computer storage memory device of claim 9, further comprising recalculating a native property value based upon a second property value of the object.

17. A system for calculating properties of an object defined by a first application, the system comprising:
   at least one processor; and
   a memory storing computer-executable instructions that, when executed by the at least one processor, perform steps comprising:
   opening, by a second application, a self-describing file created by the first application, wherein the self-describing file comprises:
      a first property of the object; and
      a second property of the object, wherein the second application does not natively support the second property of the object;
   receiving an indication that the second property of the object is dependent on the first property of the object;
   receiving a modification to the first property of the object;
   recalculating a value of the second property of the object based upon the indication that the second property of the object is dependent on the first property of the object; and
   storing the file, wherein the stored file comprises the recalculated value for the second property of the object.

18. The system of claim 17, wherein the memory further comprises computer-executable instructions to perform steps comprising:
   receiving an indication that a third property of the object is dependent on the second property of the object; and
   recalculating a value of the third property of the object based upon the indication that the third property of the object is dependent on the second property of the object.

19. The system of claim 17, wherein the memory further comprises computer-executable instructions to perform a step comprising displaying at least one native property of the object by the second application.

20. The system of claim 17, wherein the memory further comprises computer-executable instructions to perform a step comprising further comprising recalculating a native property value based upon a second property value of the object.

21. A method for accessing a self-describing file, the method comprising:
   accessing, by an application, a self-describing file, the self-describing file comprising:
      a first object, wherein the first object is unknown to the application;
      an extension element, wherein the extension is a container element for providing information related to the first object; and
      one or more child elements of the extension element, wherein the one or more child elements comprise information defining the first object; and
   maintaining the first object using the information from the one or more child elements.

\* \* \* \* \*